US006647253B2

(12) United States Patent
Yamamoto (10) Patent No.: US 6,647,253 B2
(45) Date of Patent: Nov. 11, 2003

(54) HIGH GAIN INTERMEDIATE FREQUENCY INPUT CIRCUIT WITH SATISFACTORY TRAP CHARACTERISTICS

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 483 days.

(21) Appl. No.: 09/751,992

(22) Filed: Dec. 29, 2000

(65) Prior Publication Data

US 2001/0007481 A1 Jul. 12, 2001

(30) Foreign Application Priority Data

Jan. 12, 2000 (JP) ........................................ 2000-003723

(51) Int. Cl.[7] ................................................ H04B 1/00
(52) U.S. Cl. ...................................... 455/311; 455/338
(58) Field of Search ............................ 455/193.1, 296, 455/311, 313, 323, 338, 339, 266; 348/725, 731; 334/78

(56) References Cited

U.S. PATENT DOCUMENTS 5,821,838 A * 10/1998 Suzuki et al. ................ 334/47

FOREIGN PATENT DOCUMENTS

DE 197 34 026 A1 2/1998
JP 8-163454 6/1996

* cited by examiner

Primary Examiner—Nguyen T. Vo
(74) Attorney, Agent, or Firm—Brinks Hofer Gilson & Lione (57) ABSTRACT

An intermediate frequency input circuit is coupled between output nodes of a frequency mixing circuit and input nodes of an intermediate frequency amplifier circuit. The intermediate frequency input circuit includes a pair of input nodes; a pair of output nodes; and resonance circuits, which are coupled between the pair of input nodes and resonate with an intermediate frequency of a selector channel. A series circuit is coupled between one of the pair of input nodes and one of the pair of output nodes. The series circuit includes a first trap circuit for trapping an intermediate frequency component of an upper adjacent channel coupled to first resistor. The intermediate frequency input circuit further includes a second series circuit, which is coupled between the other of the pair of input nodes and the other of the pair of output nodes. The second series circuit includes a second trap circuit for trapping an intermediate frequency component of a lower adjacent channel coupled to a second resistor. A parallel circuit, which is coupled between the pair of output nodes, includes a third resistor and a capacitor.

17 Claims, 5 Drawing Sheets

HIGH GAIN INTERMEDIATE FREQUENCY INPUT CIRCUIT WITH SATISFACTORY TRAP CHARACTERISTICS

BACKGROUND OF THE INVENTION

1. Field of the Invention

The present invention relates to an intermediate frequency input circuit, and more particularly, relates to an intermediate frequency input circuit, which is coupled between output nodes of a frequency mixing circuit and input nodes of an intermediate frequency amplifier circuit, in which an intermediate frequency characteristic of a selector channel and trap characteristics of the intermediate frequency components of the upper and lower adjacent channels can be selected.

2. Description of the Related Art

In some television tuners, an intermediate frequency input circuit is connected between output ends of a frequency mixing circuit and input ends of an intermediate frequency amplifier circuit. The intermediate frequency input circuit allows a selective intermediate frequency signal of a selector channel to pass while rejecting undesired frequency components that may occur near the intermediate frequency. A rejected frequency component may include an intermediate frequency component of an upper adjacent channel and an intermediate frequency component of a lower adjacent channel. Accordingly, undesired frequency components are not received by the intermediate frequency amplifier circuit.

Figure 4:
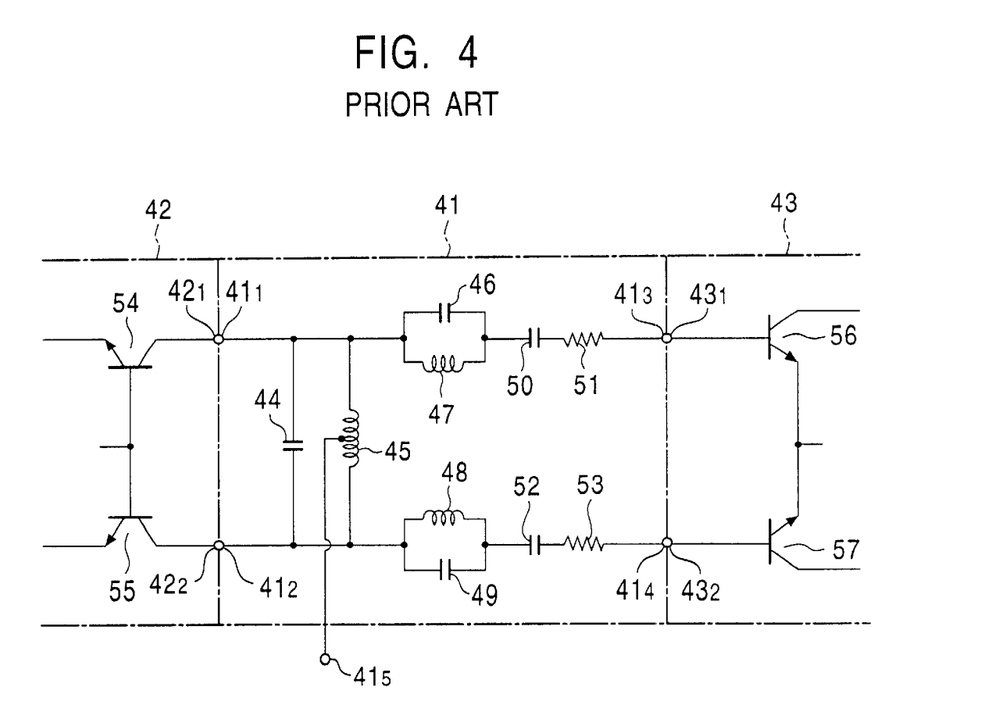
FIG. 4 is a circuit diagram of a known intermediate frequency input circuit.

FIG. 4 shows an example of a known intermediate frequency input circuit. As shown, an intermediate frequency input circuit 41 is connected between a frequency mixing circuit 42 and an intermediate frequency amplifier circuit 43. The intermediate frequency input circuit 41 includes a pair of input ends $41_1$ and $41_2$, a pair of output ends $41_3$ and $41_4$, a power supply terminal $41_5$, a first capacitor 44, a first inductor 45 having a center tap, a second capacitor 46, a second inductor 47, a third inductor 48, a third capacitor 49, a fourth capacitor 50, a first resistor 51, a fifth capacitor 52, and a second resistor 53. The frequency mixing circuit 42 includes a pair of output ends $42_1$ and $42_2$ and a pair of output transistors 54 and 55 in a common-base configuration. The intermediate frequency amplifier circuit 43 includes a pair of input ends $43_1$ and $43_2$ and a pair of input transistors 56 and 57 in a common-emitter configuration.

In the intermediate frequency input circuit 41, the first capacitor 44 and the first inductor 45 are connected in parallel between the pair of input ends $41_1$ and $41_2$. The center tap of the first inductor 45 is connected to the power supply terminal $41_5$. A parallel circuit that includes the second capacitor 46 and the second inductor 47 is between one input end $41_1$ and one output end $41_3$. This parallel circuit is connected to the fourth capacitor 50, and the first resistor 51 in series. Between the other input end $41_2$ and the other output end $41_4$ is a second parallel circuit that includes the third inductor 48 and the third capacitor 49. The second parallel circuit is connected to the fifth capacitor 52, and the second resistor 53 in series. In the frequency mixing circuit 42, a collector of the output transistor 54 is connected to one output end $42_1$, and a collector of the output transistor 55 is connected to the other output end $42_2$. In the intermediate frequency amplifier circuit 43, a base of one input transistor 56 is connected to one input end $43_1$, and a base of the other input transistor 57 is connected to the other input end $43_2$. The pair of input ends $41_1$ and $41_2$ of the intermediate frequency input circuit 41 is connected to the pair of output ends $42_1$ and $42_2$ of the frequency mixing circuit 42. The pair of output ends $41_3$ and $41_4$ of the intermediate frequency input circuit 41 is connected to the pair of input ends $43_1$ and $43_2$ of the intermediate frequency amplifier circuit 43.

In the intermediate frequency input circuit 41, the capacitance of the first capacitor 44 and the inductance of the first inductor 45 are selected so that the first capacitor 44 and the first inductor 45 are in resonance with an intermediate frequency of a selector channel. The capacitance of the second capacitor 46 and the inductance of the second inductor 47 are selected so that the second capacitor 46 and the second inductor 47 are in resonance with an intermediate frequency component of an upper adjacent channel, thus forming a first trap circuit for trapping the intermediate frequency component of the upper adjacent channel. The capacitance of the third inductor 48 and the inductance of the third capacitor 49 are selected so that the third inductor 48 and the third capacitor 49 are in resonance with an intermediate frequency component of a lower adjacent channel, thus forming a second trap circuit for trapping the intermediate frequency component of the lower adjacent channel.

The known intermediate frequency input circuit 41 operates as follows. An intermediate frequency signal (hereinafter referred to as an "IF signal") of the selector channel, which includes the unnecessary frequency components, is passed through the pair of output ends $42_1$ and $42_2$ of the frequency mixing circuit 42. The IF signal is received by the intermediate frequency input circuit 41. In the intermediate frequency input circuit 41, the resonance circuit that includes the first capacitor 44 and the first inductor 45 selects an intermediate frequency of the selector channel from the IF signal. The first trap circuit, which includes the second capacitor 46 and the second inductor 47, traps an intermediate frequency component of the upper adjacent channel of the selected intermediate frequency, which is above and adjacent to the selector channel frequency. The second trap circuit, which includes the third inductor 48 and the third capacitor 49, traps an intermediate frequency component of a lower adjacent channel of the selected intermediate frequency, which is below and adjacent to the selector channel frequency. The IF signal that passes through the first trap circuit passes through the fourth capacitor 50, which is a coupling capacitor. The first resistor 51 adjusts the amplitude of the IF signal, and the IF signal is supplied to one output end $41_3$. Simultaneously, the IF signal that passes through the second trap circuit passes through the fifth capacitor 52, which is a coupling capacitor. The second resistor 53 adjusts the level of the IF signal, and the IF signal is passed to the other output end $41_4$. The IF signal obtained at the pair of output ends $41_3$ and $41_4$ is received by the pair of input ends $43_1$ and $43_2$ of the intermediate frequency amplifier circuit 43, and the input IF signal is amplified by the pair of input transistors 56 and 57.

Figure 5:
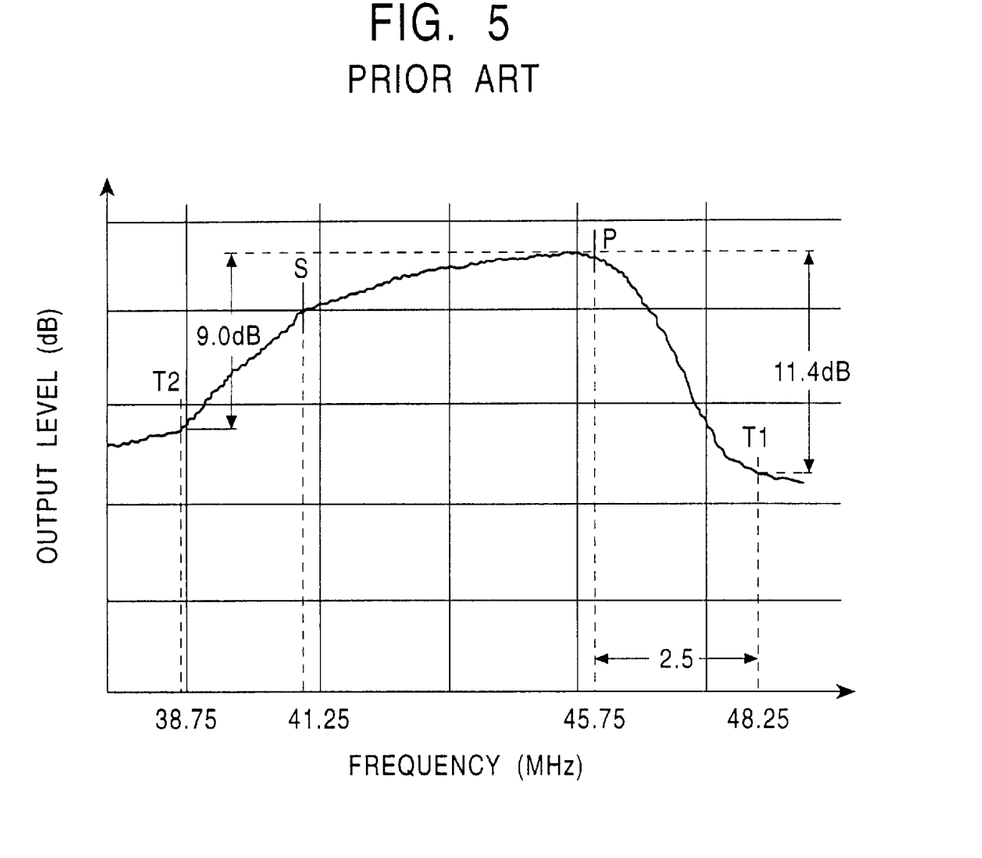
FIG. 5 is a graphical example of a frequency characteristic of the intermediate frequency input circuit shown in FIG. 4.

FIG. 5 shows an example of a frequency characteristic of the intermediate frequency input circuit 41 shown in FIG. 4. In FIG. 5, reference symbol P denotes a picture frequency in the intermediate frequency range of the selector channel. Reference symbol S denotes a sound frequency in the intermediate frequency range of the selector channel. Reference symbol T1 denotes the intermediate frequency component of the lower adjacent channel (N−1) of the selector channel (N). Reference symbol T2 denotes the intermediate frequency component of the upper adjacent channel (N+1) of the selector channel (N).

Referring to FIGS. 4 and 5, the known intermediate frequency input circuit 41 has a selective characteristic for the intermediate frequency of the selector channel, and has separate trap characteristics for the intermediate frequency components of the lower adjacent channel and the upper adjacent channel. The difference in amplitude between the peak amplitude of the intermediate frequency of the selector channel and the trap amplitude of the intermediate frequency component of the lower adjacent channel is approximately 11.4 dB in this circuit. The difference in amplitude between the peak amplitude of the intermediate frequency of the selector channel and the trap amplitude of the intermediate frequency component of the upper adjacent channel is approximately 9.0 dB in this circuit. The rejection of the undesired frequency components, i.e., the intermediate frequency component of the lower adjacent channel and the intermediate frequency component of the upper adjacent channel, is not satisfactory. Moreover, a gain for the intermediate frequency of the selector channel is also not satisfactory.

SUMMARY OF THE INVENTION

In view of the above, the preferred embodiments of the present invention provide an intermediate frequency input circuit having a high gain for an intermediate frequency of a selector channel and an acceptable trap characteristic for the intermediate frequency components of an upper adjacent channel and a lower adjacent channel.

An intermediate frequency input circuit is provided, which is coupled between output nodes of a frequency mixing circuit and input nodes of an intermediate frequency amplifier circuit. The intermediate frequency input circuit includes a pair of input nodes and a pair of output nodes. A resonance circuit, which is coupled between the pair of input nodes, resonates according to an intermediate frequency of a selector channel. A first series circuit, which is preferably coupled between one of the pair of input nodes and one of the pair of output nodes, includes a first trap circuit programmed or configured to trap an intermediate frequency component of an upper adjacent channel and a first resistor. A second series circuit, which is preferably coupled between the other of the pair of input nodes and the other pair of output nodes, includes a second trap circuit programmed or configured to trap an intermediate frequency component of a lower adjacent channel and a second resistor. A parallel circuit, which is coupled between the pair of output nodes, includes a third resistor and a capacitor.

In one aspect, the parallel circuit, which includes the third resistor and the capacitor, is coupled between the pair of output nodes. Compared to some known characteristics of an intermediate frequency input circuit, a high gain characteristic for the intermediate frequency of the selector channel is obtained. This aspect also obtains acceptable trap characteristics for the intermediate frequency component of the upper adjacent channel and for the intermediate frequency component of the lower adjacent channel.

Figure 1:
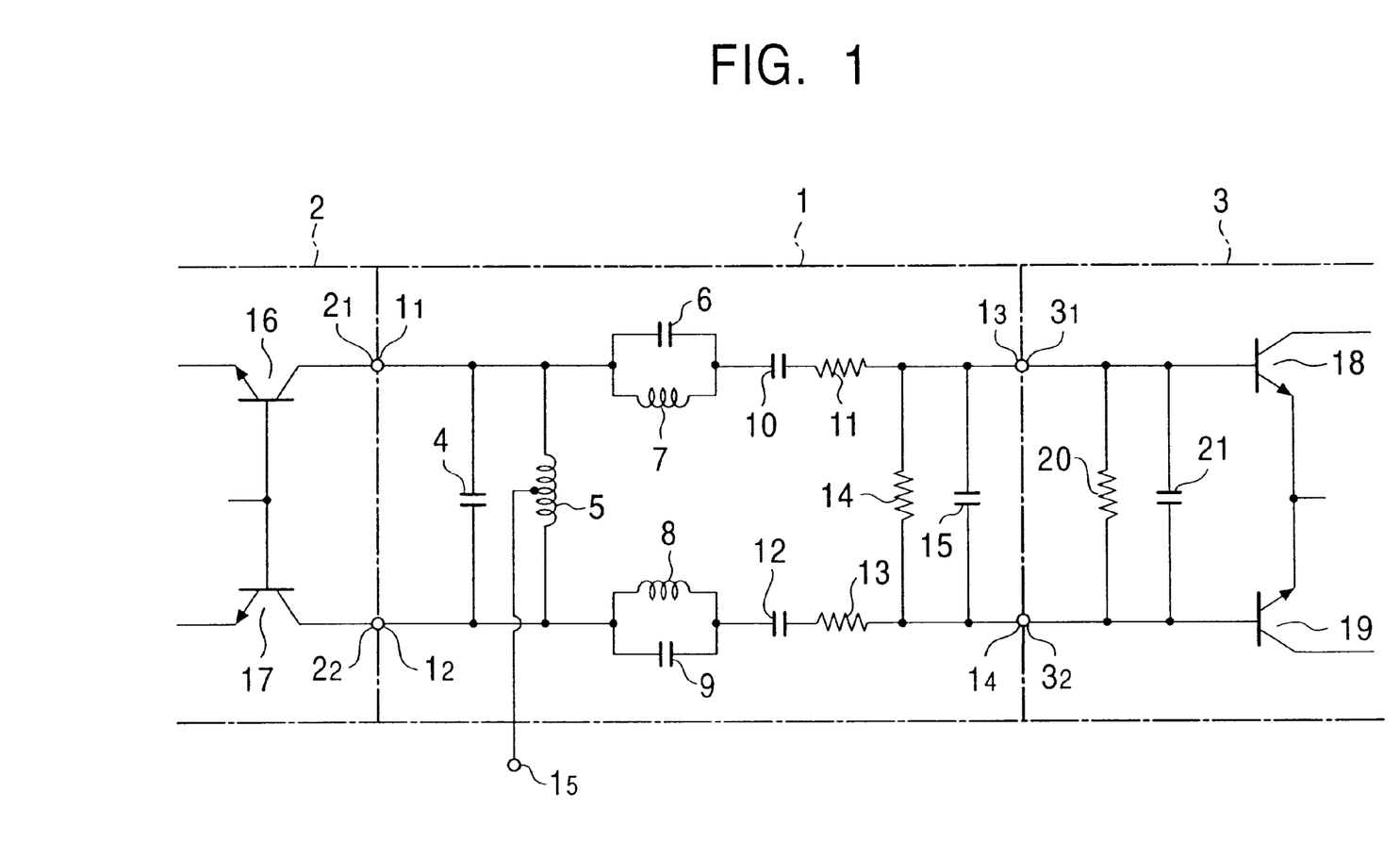
FIG. 1 is a circuit diagram of an intermediate frequency input circuit according to a preferred embodiment of the present invention.

The lines drawn between the electrical components in FIG. 1 represents direct and indirect connections. Other circuitry may be electrically coupled between the frequency mixing circuit, intermediate frequency circuit, the intermediate frequency amplifier circuit and the components that comprise these circuits.

DESCRIPTION OF THE PREFERRED EMBODIMENTS

The present invention is illustrated from the following description of the preferred embodiments and the accompanying drawings. FIG. 1 shows an intermediate frequency input circuit according to a preferred embodiment of the present invention. As shown, an intermediate frequency input circuit 1, or a second stage, is coupled between a frequency mixing circuit 2, or a first stage and an intermediate frequency amplifier circuit which is preferably a third stage. Preferably, the frequency mixing circuit 2 has a high output impedance and preferably the . intermediate frequency amplifier circuit 3 has a low input impedance.

The intermediate frequency input circuit 1 includes a pair of input nodes $1_1$ and $1_2$, a pair of output nodes $1_3$ and $1_4$, a power supply terminal $1_5$, a first capacitor 4, a first inductor 5 having a center tap, a second capacitor 6, a second inductor 7, a third inductor 8, a third capacitor 9, a fourth capacitor 10, a first resistor 11, a fifth capacitor 12, a second resistor 13; a third resistor 14, and a sixth capacitor 15. The frequency mixing circuit 2 includes a pair of output nodes $2_1$ and $2_2$ and a pair of output transistors 16 and 17 in a common-base configuration. The intermediate frequency amplifier circuit 3 includes a pair of input nodes $3_1$ and $3_2$, a pair of input transistors 18 and 19 in a common-emitter configuration, a resistor 20, and a capacitor 21. Preferably, the resistor 20 and the capacitor 21 matches the impedance of the third resistor 14 and the sixth capacitor 15.

In the intermediate frequency input circuit 1, the first capacitor 4 and the first inductor 5 are coupled in parallel like a tank circuit between the pair of input nodes $1_1$ and $1_2$. The center tap of the first inductor 5 is coupled to a power supply which may be a programmable power supply, a manual power supply, or any other voltage source. Between one input node $1_1$ and one output node $1_3$ is a first parallel circuit, which is referred to as the first trap circuit. The first trap circuit includes the second capacitor 6 and the second inductor 7. Preferably, the first trap circuit is coupled to the fourth capacitor 10 and the first resistor 11 in series. Between the other input node $1_2$ and the other output node $1_4$, is a second parallel circuit, which is referred to as the second trap circuit. The second trap circuit includes the third inductor 8 and the third capacitor 9. Preferably, the second trap circuit is coupled to the fifth capacitor 12, and the second resistor 12 in series. Between the pair of output nodes $1_3$ and $1_4$, the third resistor 14 and the sixth capacitor 15 are coupled in parallel.

In the frequency mixing circuit 2, preferably a collector of one output transistor 16 is coupled to one output node $2_1$, and a collector of the other output transistor 17 is coupled to the other output node $2_2$. In the preferred intermediate frequency amplifier circuit 3, the resistor 20 and the capacitor 21 are coupled in parallel between the pair of input nodes $3_1$ and $3_2$. A base of one input transistor 18 is coupled to one input node $3_1$, and a base of the other input transistor 19 is coupled to the other input node $3_2$. The pair of input nodes $1_1$ and $1_2$ of the intermediate frequency input circuit 1 is coupled to the pair of output nodes $2_1$ and $2_2$ of the frequency mixing circuit 2. The pair of output nodes $1_3$ and $1_4$ of the intermediate frequency input circuit 1 is coupled to the pair of input nodes $3_1$ and $3_2$ of the intermediate frequency amplifier circuit 3.

In the preferred intermediate frequency input circuit 1, the capacitance of the first capacitor 4 and the inductance of the first inductor 5 are selected so that the first capacitor 4 and the first inductor 5 are in parallel resonance with an intermediate frequency of a selector channel. The capacitance of the second capacitor 6 and the inductance of the second inductor 7 are selected so that the second capacitance 6 and the second inductor 7 are in parallel resonance with an intermediate frequency component of an upper adjacent channel. The first trap circuit traps the intermediate frequency component of the upper adjacent channel. The inductance of the third inductor 8 and the capacitance of the third capacitor 9 are selected so that the third inductor 8 and the third capacitor 9 are in parallel resonance with an intermediate frequency component of a lower adjacent channel. The second trap circuit traps the intermediate frequency component of the lower adjacent channel. By adjusting the resistance of the third resistor 14, trap characteristics for the intermediate frequency component of the upper adjacent channel and the lower adjacent channel are preferably adjusted. By adjusting the capacitance of the sixth capacitor 15, the intermediate frequency bandwidth of the selector channel is preferably adjusted.

The intermediate frequency input circuit 1 operates as follows. An intermediate frequency signal (hereinafter referred to as an "IF signal") of the selector channel, which includes undesired frequency components, passes through the pair of output nodes $2_1$ and $2_2$ of the frequency mixing circuit 2. The IF signal is received by the intermediate frequency input circuit 1 through the pair of input nodes $1_1$ and $1_2$. In the preferred intermediate frequency input circuit 1, a parallel resonance circuit includes the first capacitor 4 and the first inductor 5, which is in parallel resonance with an intermediate frequency of the selector channel. Preferably the parallel resonance circuit that includes the first capacitor 4 and the first inductor 5 selects the intermediate frequency of the selector channel. Preferably, the first trap circuit, which preferably includes the second capacitor 6 and the second inductor 7, traps the intermediate frequency component of the upper adjacent channel, which is positioned above and adjacent to the selector channel frequency, in the intermediate frequency range of the selector channel. The second trap circuit, which preferably includes the third inductor 8 and the third capacitor 9, traps the intermediate frequency component of the lower adjacent channel, which is positioned below and adjacent to the selector channel frequency, in the intermediate frequency range of the selector channel. The IF signal in which the intermediate frequency component of the upper adjacent channel is trapped by the first trap circuit passes through the fourth capacitor 10, which is a coupling capacitor, and the amplitude of the IF signal is adjusted by the first resistor 11. At the same time, the IF signal in which the intermediate frequency component of the lower adjacent channel is trapped by the second trap circuit passes through the fifth capacitor 12, which is a coupling capacitor, and the amplitude of the IF signal is adjusted by the second resistor 13. A parallel circuit including the third resistor 14 and the sixth capacitor 15 adjusts the intermediate frequency bandwidth, the intermediate frequency peak amplitude, the amplitude difference between the intermediate frequency peak amplitude and the trap amplitude of the intermediate frequency component of the lower adjacent channel, and the amplitude difference between the intermediate frequency peak amplitude and the trap amplitude of the intermediate frequency component of the upper adjacent channel. The adjusted IF signal is passed through the pair of output nodes $1_3$ and $1_4$. The IF signal that passes through the pair of output nodes $1_3$ and $1_4$ is received by the pair of input nodes $3_1$ and $3_2$ of the intermediate frequency amplifier circuit 3, and the IF signal is then preferably amplified by the pair of input transistors 18 and 19.

In this preferred embodiment, adjustment of each part of the IF signal is performed by adjusting the resistance of the third resistor 14 and the capacitance of the sixth capacitor 15. As the resistance of the third resistor 14 decreases, the intermediate frequency peak amplitude gradually decreases, whereas the trap amplitude of the intermediate frequency component of the lower adjacent channel and the trap amplitude of the intermediate frequency component of the upper adjacent channel decreases to a greater degree than the decrease of the intermediate frequency peak amplitude. Hence, the difference (i.e., the suppression ratio or the ratio of the lower voltage range to the voltage span) becomes greater between the intermediate frequency peak amplitude and the trap amplitude of the intermediate frequency component of the lower adjacent channel. Moreover, the difference or the suppression ratio becomes greater between the intermediate frequency peak amplitude and the trap amplitude of the intermediate frequency component of the upper adjacent channel. In contrast, as the resistance of the third resistor 14 increases, the intermediate frequency peak amplitude gradually increases. Moreover, the trap amplitude of the intermediate frequency component of the lower adjacent channel and the trap amplitude of the intermediate frequency component of the upper adjacent channel increase to a greater degree than the increase of the intermediate frequency peak amplitude. Hence, the difference or the suppression ratio becomes smaller between the intermediate frequency peak amplitude and the trap amplitude of the intermediate frequency component of the lower adjacent channel. The difference or the suppression ratio also becomes smaller between the intermediate frequency peak amplitude and the trap amplitude of the intermediate frequency component of the upper adjacent channel.

As the capacitance of the sixth capacitor 15 increases, the high pass-band in the intermediate frequency band of the selector channel gradually becomes wider. In contrast, as the capacitance of the sixth capacitor 15 decreases, the high pass-band in the intermediate frequency band of the selector channel gradually becomes narrower.

As the resistance of the first resistor 11 decreases, the high amplitude of the intermediate frequency band of the selector channel gradually increases. As the resistance of the first resistor 11 increases, the high amplitude of the intermediate frequency band of the selector channel gradually decreases. Similarly, as the resistance of the second resistor 13 decreases, the low amplitude of the intermediate frequency band of the selector channel gradually increases. As the resistance of the second resistor 13 increases, the low amplitude of the intermediate frequency band of the selector channel gradually decreases.

Figure 2:
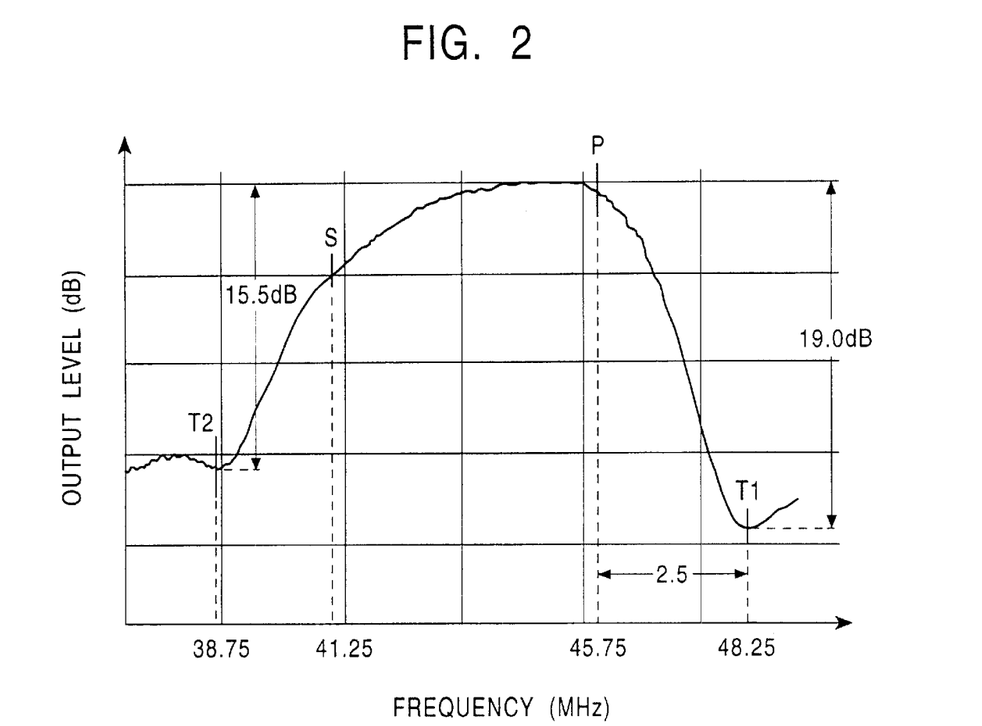
FIG. 2 is a graphical example of a frequency characteristic of the intermediate frequency input circuit shown in FIG. 1.
Figure 3:
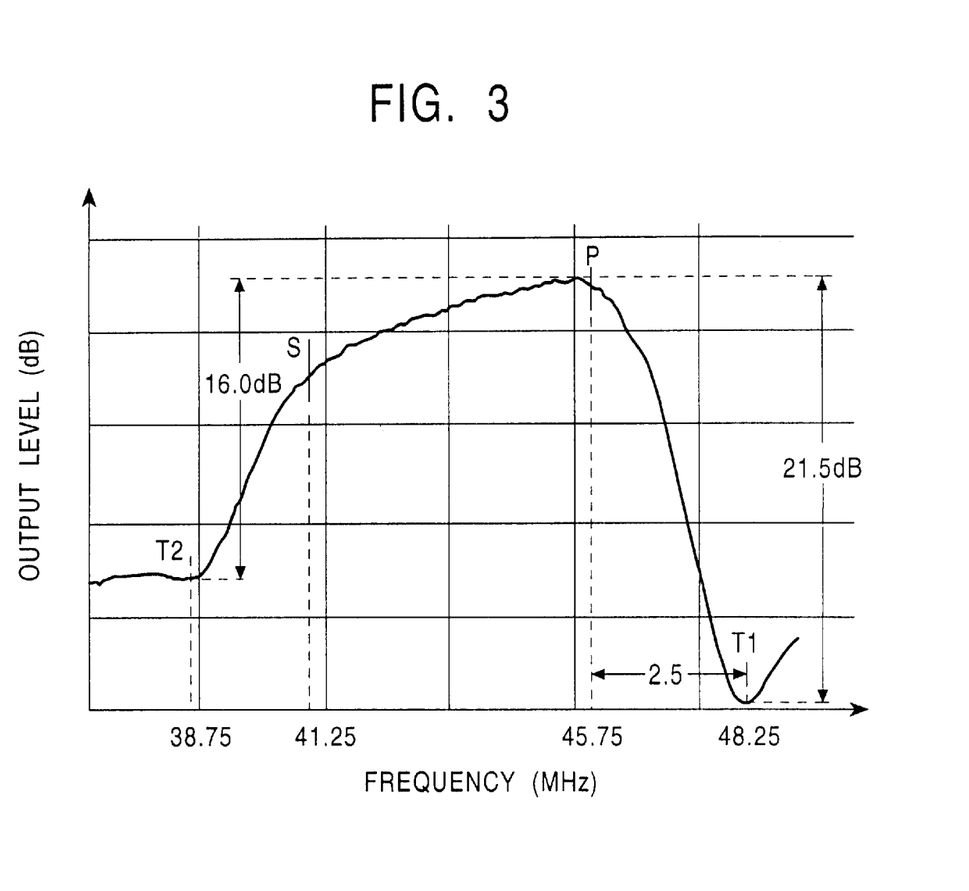
FIG. 3 is another graphical example of a frequency characteristic of the intermediate frequency input circuit shown in FIG. 1.

FIG. 2 shows a graph of an exemplary frequency characteristic of the intermediate frequency input circuit 1 shown in FIG. 1. FIG. 3 shows another exemplary graph of a frequency characteristic of the intermediate frequency input circuit 1 shown in FIG. 1. The difference illustrated between FIGS. 2 and 3 were generated by altering the resistance of the third resistor 14.

Referring to FIGS. 2 and 3, reference symbol P denotes a picture frequency of the intermediate frequency of the selector channel. Reference symbol S denotes a sound frequency of the intermediate frequency of the selector channel. Reference symbol T1 denotes the intermediate frequency component of the lower adjacent channel (N−1) of the selector channel (N). Reference symbol T2 denotes the intermediate frequency component of the upper adjacent channel (N+1) of the selector channel (N).

As shown in FIG. 2, in the intermediate frequency input circuit 1, the resistance of the third resistor 14 is changed to a high value (hereinafter this is referred to as the first embodiment) which causes the intermediate frequency peak amplitude to increase. In contrast, the difference or the suppression ratio between the intermediate frequency peak amplitude and the trap amplitude of the intermediate frequency component of the lower adjacent channel of this embodiment is 19.0 dB, and the difference or the suppression ratio between the intermediate frequency peak amplitude and the trap amplitude of the intermediate frequency component of the upper adjacent channel of this embodiment is 15.5 dB. From a comparison between the exemplary suppression ratios of 19.0 dB and 15.5 dB of the intermediate frequency input circuit 1 of the first embodiment and the suppression ratios of 11.4 dB and 9.0 dB of a known intermediate frequency input circuit 41 shown in FIG. 5, it can be concluded that the suppression ratios of the intermediate frequency input circuit 1 of the first embodiment are much greater. Hence, the intermediate frequency input circuit 1 with large suppression ratios is obtained.

In contrast, as shown in FIG. 3, in the intermediate frequency input circuit 1, the resistance of the third resistor 14 is changed to a low value (hereinafter this is referred to as a second embodiment). Although the intermediate frequency peak amplitude is somewhat smaller than that of the intermediate frequency input circuit 1 of the first embodiment, the difference or the suppression ratio between the intermediate frequency peak amplitude and the trap amplitude of the intermediate frequency component of the lower adjacent channel of this embodiment is 21.5 dB and the difference or the suppression ratio between the intermediate frequency peak amplitude and the trap amplitude of the intermediate frequency component of the upper adjacent channel of this embodiment is 16.0 dB. From a comparison between the exemplary suppression ratios of 21.5 dB and 16.0 dB of the intermediate frequency input circuit 1 of the second embodiment and the suppression ratios of 11.4 dB and 9.0 dB of the known intermediate frequency input circuit 41 shown in FIG. 5, it can be concluded that the suppression ratios of the intermediate frequency input circuit 1 of the second embodiment are much greater. Hence, the intermediate frequency input circuit 1 with large suppression ratios is obtained. The intermediate frequency input circuit 1 of the second embodiment has larger suppression ratios than the intermediate frequency input circuit 1 of the first embodiment.

The foregoing detailed description describes only a few of the many forms that the present invention can take and should therefore be taken as illustrative rather than limiting. It is only the claims, including all equivalents that are intended to define the scope of the invention.

What is claimed is:

1. An intermediate frequency circuit, which is connected between a frequency mixing circuit and an intermediate frequency amplifier circuit, the intermediate frequency circuit comprising:

a pair of input nodes;

a pair of output nodes;

a parallel resonance circuit, which is coupled between the pair of input nodes, the parallel resonance circuit being configured to resonate in parallel with an intermediate frequency of a selector channel;

a first circuit, which is coupled between a first input node and a first output node, including a first trap circuit configured to trap an intermediate frequency component of an upper adjacent channel of a selected intermediate frequency;

a second circuit, which is coupled between a second input node and a second output node, including a second trap circuit configured to trap an intermediate frequency component of a lower adjacent channel of the selected intermediate frequency; and a parallel circuit, which is coupled between the pair of output nodes, comprising a resistor and a capacitor.

2. The intermediate frequency circuit of claim 1, wherein said first circuit comprises a second resistor coupled in series to the first trap circuit.

3. The intermediate frequency circuit of claim 1, wherein said second circuit comprises a third resistor coupled in series to the first trap circuit.

4. The intermediate frequency circuit of claim 1 further comprising a second parallel circuit comprised of a second resistor and a second capacitor coupled in parallel to the parallel circuit.

5. A television tuner, comprising:

a first, a second, a third, and a fourth node;

a tank circuit electrically coupled between the first and second nodes;

a parallel RC circuit electrically coupled to the third and the fourth node;

a first trap circuit electrically coupled between the first and the third node; and a second trap circuit electrically coupled between the second and the fourth node.

6. The television tuner of claim 5, further comprising a frequency mixing circuit electrically coupled between the first and the second node.

7. The television tuner of claim 6 further comprising an amplifier electrically coupled to the third and the fourth node.

8. The television tuner of claim 5 further comprising an amplifier electrically coupled between the third and the fourth node.

9. The television tuner of claim 5 wherein said tank circuit comprises an LC circuit having a center tap.

10. The television tuner of claim 5 further comprising a second parallel RC circuit electrically coupled in parallel to the parallel RC circuit.

11. The television tuner of claim 5 further comprising a coupling capacitor electrically coupled between the first trap circuit and the parallel RC circuit.

12. The television tuner of claim 11 further comprising a second coupling capacitor electrically coupled between the second trap circuit and the parallel RC circuit.

13. The television tuner of claim 5 further comprising a coupling capacitor electrically coupled between the second trap circuit and the parallel RC circuit.

14. A method of adjusting the suppression ratio of a television tuner comprising:

providing a first, a second, a third, and a fourth node;

providing a tank circuit electrically coupled between the first and second node;

providing a parallel RC circuit electrically coupled between the third and the fourth node;

providing a first trap circuit electrically coupled between the first and the third node;

providing a second trap circuit electrically coupled between the second and the fourth node; and adjusting at least one of a resistor and a capacitor that comprise the RC circuit.

15. The method of claim 14 comprising adjusting the resistor of the RC circuit.

16. The method of claim 14 comprising adjusting the capacitor of the RC circuit.

17. The method claim 14 comprising adjusting the resistor and the capacitor of the RC circuit.

* * * * *

UNITED STATES PATENT AND TRADEMARK OFFICE
CERTIFICATE OF CORRECTION

PATENT NO. : 6,647,253 B2
DATED : November 11, 2003
INVENTOR(S) : Masaki Yamamoto It is certified that error appears in the above-identified patent and that said Letters Patent is hereby corrected as shown below:

<u>Column 10,</u>
Line 5, after "method" insert -- of --.

Signed and Sealed this

Third Day of February, 2004

JON W. DUDAS
*Acting Director of the United States Patent and Trademark Office*